(12) United States Patent
Olofsson et al.

(10) Patent No.: US 10,412,122 B1
(45) Date of Patent: Sep. 10, 2019

(54) DYNAMIC PER-SESSION NAT-BEHAVIOR SELECTION

(71) Applicant: Cisco Technology, Inc., San Jose, CA (US)

(72) Inventors: Lars Olof Stefan Olofsson, Dubai (AE); Syed Khalid Raza, Fremont, CA (US); Murtuza Attarwala, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 238 days.

(21) Appl. No.: 15/004,882

(22) Filed: Jan. 22, 2016

(51) Int. Cl.
*H04L 29/06* (2006.01)
*H04L 29/12* (2006.01)

(52) U.S. Cl.
CPC ........ *H04L 65/1069* (2013.01); *H04L 61/256* (2013.01); *H04L 65/1086* (2013.01)

(58) Field of Classification Search
CPC ..... H04L 65/10; H04L 65/1069; H04L 29/12; H04L 29/125; H04L 29/12009; H04L 29/12509; H04L 29/12528
USPC ........ 709/227, 228, 230, 245, 223; 370/252, 370/389; 726/1, 11
See application file for complete search history.

(56) References Cited

U.S. PATENT DOCUMENTS

| | | | | |
|---|---|---|---|---|
| 6,687,245 B2* | 2/2004 | Fangman | .......... | H04L 29/06027 370/356 |
| 7,272,650 B2* | 9/2007 | Elgebaly | ................. | H04L 29/06 709/223 |
| 7,411,917 B1* | 8/2008 | Hardie | .............. | H04L 29/12528 370/252 |
| 7,515,549 B2* | 4/2009 | Wing | ................ | H04L 29/12009 370/252 |
| 7,620,033 B2* | 11/2009 | Chu | ................... | H04L 29/12009 370/235 |
| 7,738,468 B2* | 6/2010 | Standridge | ........ | H04L 29/12377 370/401 |
| 7,894,427 B2* | 2/2011 | Jayasenan | ......... | H04L 29/12009 370/389 |
| 7,983,228 B1* | 7/2011 | Choksi | ................ | H04L 65/1016 370/338 |
| 8,296,437 B2* | 10/2012 | Pankratov | ......... | H04L 29/12528 709/227 |
| 2006/0072569 A1* | 4/2006 | Eppinger | .......... | H04L 29/12009 370/389 |

(Continued)

OTHER PUBLICATIONS

Stiemerling M, Tschofenig H, Aoun C, Davies E. NAT/firewall NSIS signaling layer protocol (NSLP). 2010. (Year: 2010).*

*Primary Examiner* — Ranodhi Serrao
*Assistant Examiner* — James N Fiorillo
(74) *Attorney, Agent, or Firm* — Polsinelli PC

(57) ABSTRACT

A method for establishing a communication sessions based on a Network Address Translation (NAT) device is provided. The method comprises configuring the NAT device with policy to control the creation of NAT translation entries to support communications between devices residing behind the NAT device, and devices residing outside the NAT device; wherein said policy allows the NAT device to establish multiple communications sessions, each with a dynamic NAT traversal behavior; and configuring the NAT device to maintain a control plane session with an orchestrator device whereby the NAT device learns parameters required to establish a translation entry for each communications session.

14 Claims, 8 Drawing Sheets

(56) References Cited

U.S. PATENT DOCUMENTS

| | | | | |
|---|---|---|---|---|
| 2006/0215652 A1* | 9/2006 | Strandridge | H04L 29/12377 | 370/389 |
| 2007/0058644 A1* | 3/2007 | Brahmbhatt | H04L 29/12 | 370/401 |
| 2007/0281665 A1* | 12/2007 | Cho | H04L 63/062 | 455/411 |
| 2008/0126528 A1* | 5/2008 | Takeda | H04L 29/12066 | 709/223 |
| 2008/0165802 A1* | 7/2008 | Tang | H04L 29/12509 | 370/466 |
| 2008/0240132 A1* | 10/2008 | Sehgal | H04L 29/12547 | 370/401 |
| 2009/0279537 A1* | 11/2009 | Strickland | H04L 61/2564 | 370/352 |
| 2010/0077087 A1* | 3/2010 | Roy | H04L 29/1249 | 709/228 |
| 2010/0205313 A1* | 8/2010 | Boire-Lavigne | H04L 29/125 | 709/228 |
| 2011/0158239 A1* | 6/2011 | Mohaban | H04L 63/029 | 370/392 |
| 2013/0039364 A1* | 2/2013 | Pankratov | H04L 29/12528 | 370/389 |
| 2013/0185440 A1* | 7/2013 | Blau | H04L 61/2589 | 709/227 |
| 2014/0289791 A1* | 9/2014 | Acharya | H04L 63/0236 | 726/1 |
| 2015/0092772 A1* | 4/2015 | Copeland | H04L 45/745 | 370/389 |
| 2015/0304427 A1* | 10/2015 | Ortacdag | H04L 61/256 | 713/160 |
| 2018/0063033 A1* | 3/2018 | Olofsson | H04L 63/02 | |

* cited by examiner

DYNAMIC PER-SESSION NAT-BEHAVIOR SELECTION

FIELD

Embodiments of the present invention relate to networking.

BACKGROUND

Network Address Translation (NAT) traversal is a challenge in computer networking that has become a ubiquitous factor that must be taken into consideration when creating new protocols, technologies and services. In current networks, NAT is deployed as a means of security, address-space and network topology abstraction in addition to the originally intended purpose of extending diminishing IPv4 address space.

Because of the variety in application of NAT as a technology, differing requirements has caused great divergence in how a NAT-function is implemented on a given network device. Some implementations first and foremost consider security, while others consider scalability as the primary objective, and there are several flavors in between. Considering these factors when trying to enable an application that must operate transparently whether or not a NAT-device is present in the network transport path or not is required, but extends to a larger challenge when multiple different types of NAT implementations must be considered concurrently and in combination. While such deployments are common in current networks there are certain applications that experience great difficulty, or that may not even function, in such an environment. The dilemma then arises whether or not to sacrifice the overall level of attainable security for the sake of functionality or to avoid deploying certain applications altogether, much to the dismay of security officers in the former case and users in the latter.

The common types of NAT-implementations are the following:
  Endpoint Independent (aka Full Cone), establishes a translation entry between the inside private address and the outside public address and allows any incoming connection from the outside to be established with to the private address
  Address Dependent (aka Restricted Cone), establishes a translation entry between the inside private address and the outside public address and only allows incoming connections from the outside originating from the address the original flow was using as the destination address.
  Address and Port Dependent (aka Port-Restricted Cone), establishes a translation entry between the inside private address and the outside public address and only allows incoming connections from the outside originating from the address and upper layer protocol port the original flow was using as the destination address and port.
  Symmetric, establishes a translation entry between the inside private address and the outside public address where the outside upper layer protocol port is uniquely assigned to every Source Address/Port and Destination Address/Port flow that creates the translation entry in the NAT. Any incoming connection not exactly matching the outside Source Address/Port and Destination Address/Port is disallowed.
Depending on the specific type of NAT that a given node may be sitting behind or employing locally, incoming connections are treated differently as is evident by the definition of the different types of NAT discussed above. This can create connectivity issues since different protocols deal with NAT-traversal in different ways and may not be able to traverse certain types of NAT without an adaptation of behavior or using a third party node to merge the different legs of a given session-layer connection. In many current implementations, protocols have been adapted to support NAT-traversal and then assume that the NAT will behave in a certain way. If the conditions related to session establishment in such a context are not met then a node may be trying indefinitely, resulting in a poor user experience.

It is also true that depending on which type of NAT that is being deployed there will be different implications on network security. For example, if a certain location is deploying a Symmetric NAT where the characteristics of each individual session (Inside Address and Port together with Outside Address and Port) is being determined by the NAT at the time of the session-establishment by the inside party of a given session, then it is much harder for an intruder to make use of such a translation entry for gaining access to the inside network. This, compared to a NAT employing an Endpoint Independent architecture where any outside entity can gain access to the inside network simply by guessing which ports may be opened from the inside as long as the outside address of the NAT is known, makes for two completely different challenges in terms of staging an attack on a network.

SUMMARY

According to one aspect of the invention, a NAT-device is configured to dynamically decide how a given session is to be managed at the time of establishment. If only certain services, applications or servers residing on the inside of the NAT are exposed through an Endpoint Independent NAT and the remaining sessions are managed through a Symmetric NAT then applications requiring the former can be supported without impacting the security of the latter. Different sessions, applications or endpoints (servers) on the inside receive different treatment based on policy defined on the NAT-device dictating how each translation entry is to be created. This takes place dynamically, without pre-allocating any resources in terms of outside addresses or given transport-layer ports for specific purposes.

The behavior may be defined statically on a NAT-device, where a configured policy dictates which internal endpoints will receive which translation treatment, or dynamically and importantly, in a more specifically controlled manner, where a control plane protocol is used to prime the NAT for which incoming sessions should be allowed to attach to which established translations.

Other aspects of the invention will be apparent from the detailed description below.

DETAILED DESCRIPTION

Figure 1:
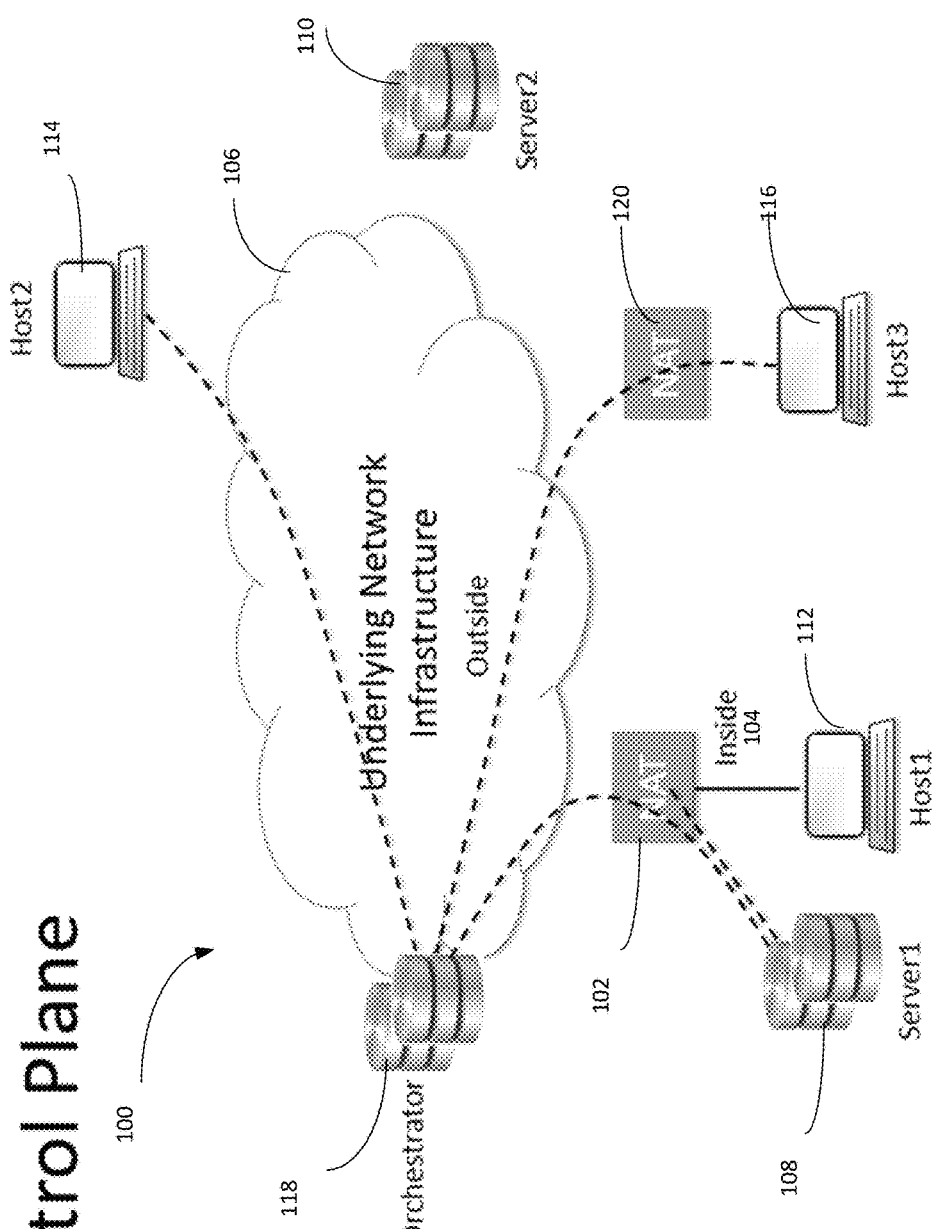
FIGS. 1-2 show a control plane, and a forwarding plane of an exemplary network, in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the invention disclose techniques for a NAT-device to dynamically determine how a given session is to be managed at the time of establishment. If only certain services, applications or servers residing on the inside of the NAT device are to be exposed through an Endpoint Independent NAT and the remaining sessions are managed through a Symmetric NAT then applications requiring the former can be supported without impacting the security of the latter. Thus, embodiments of the invention allow different sessions, applications or endpoints (servers) on the inside of a NAT device to receive different treatment based on policy defined on the NAT-device dictating how each translation entry is to be created. Advantageously, the differential treatment or behavior of a NAT-device based on policy may be achieved dynamically, without pre-allocating any resources in terms of outside addresses or given transport-layer ports for specific purposes.

In one embodiment, the behavior of a NAT device may be defined statically on the NAT-device, where a configured policy dictates which internal endpoints will receive which translation treatment. Alternatively, the NAT behavior may be achieved dynamically where a control plane protocol is used to prime the NAT device for which incoming sessions should be allowed to attach to which established translations.

Aspects of the present invention, provide the following advantages:

- The ability for a NAT-implementation to concurrently support multiple NAT-traversal behaviors, such as Endpoint Independent and Symmetric, or other combinations
- The ability for a NAT-device to support a policy construct that is to be applied as new sessions are created from the inside of the device from a view of the NAT function
- The ability to dynamically apply different NAT-translation behaviors concurrently as traffic is being managed for multiple sessions that are established through the NAT-device
- The ability to attach the aforementioned concurrent NAT-translation behaviors to any given entity being used as part of the NAT-function, such as inside and outside IP-addresses, where no specific resources are required that changes the appearance of the device on the network, while supporting the concurrent NAT-translation behaviors
- The ability to dynamically add or remove a given NAT-translation behavior being in active use depending on which current sessions are established through the NAT-device
- The ability to allow a control plane protocol prime the NAT with unique identifiers and unique attributes for specific incoming sessions to aid NAT traversal
- The ability for the NAT to use extended session recognition mechanics related to prior priming by a control plane protocol (such as IP-address ranges for Source IP-addresses, extended ranges for Source-Ports, other unique aspects of an incoming packet such as Protocol Identifier, Sequence Number, IPsec SPI and so on)

Dynamic Per-Session NAT-Behavior Selection in Operation

Figure 2:
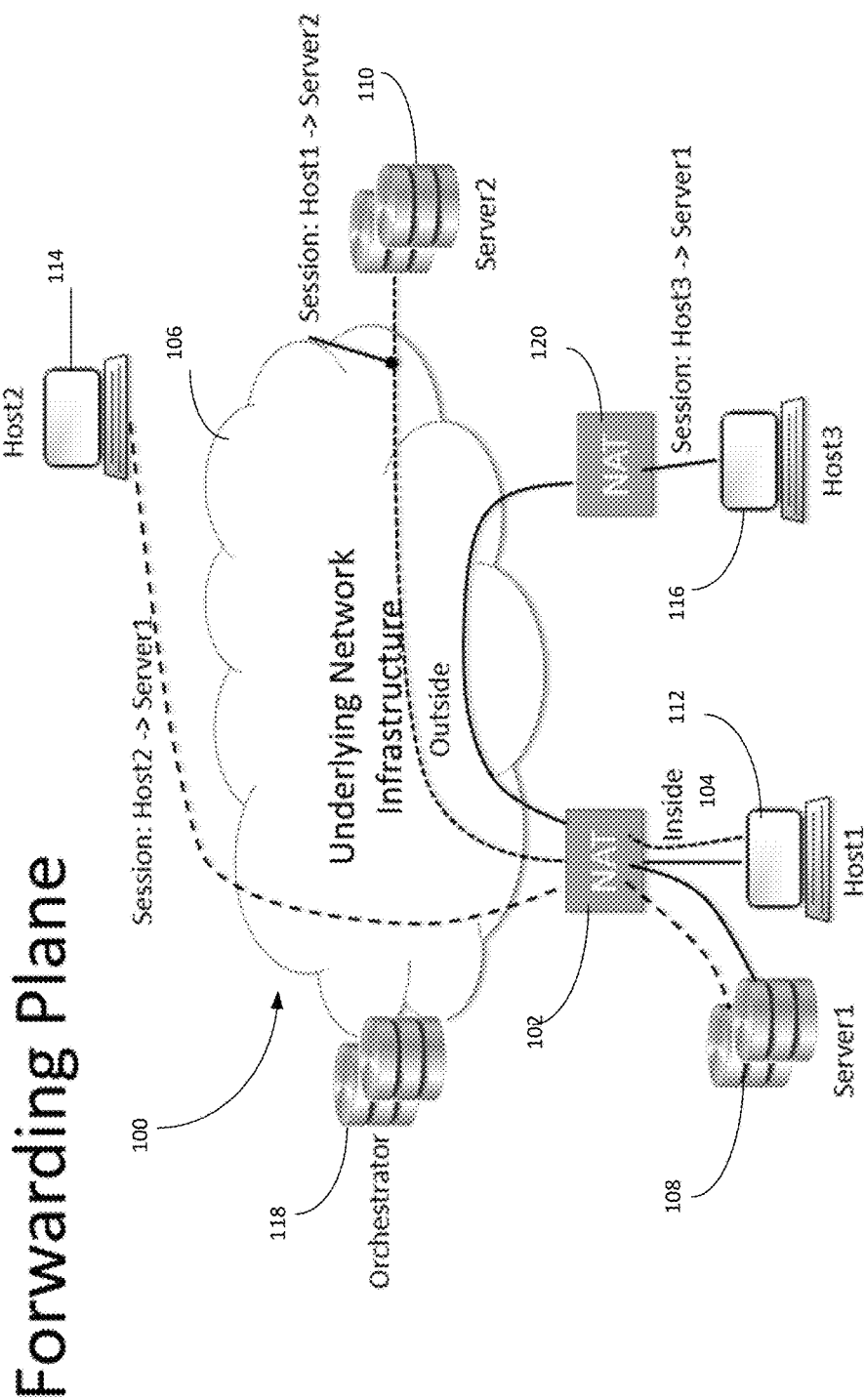

FIGS. 1-2 show embodiments of a network 100 in which embodiments of the present invention may be practiced. More specifically FIG. 1 shows the control plane for the network 100, whereas FIG. 2 shows the forwarding plane for said network. As will be seen, the network 100 includes the following components:

- A NAT-device 102 providing connectivity between a given private network (the Inside 104) and a given network, either publically accessible or generally accessible within an organizational network (the Outside 106)
- Application servers or other network elements that provide an application on the Inside network 104, that must be accessed by other entities on the Outside network 106. More particularly, FIG. 1 shows a Server 1 indicated by reference number 108, and a Server 2 indicated by reference number 110
- Client hosts or other routers residing in the Outside network 106 that require access to the applications provided on the Inside network 104. More particularly, the network 100 includes a Host 1 indicated by reference numeral 112, a Host 2 indicated by reference numeral 114, and a Host 3 indicated by reference 116
- Other hosts, servers or routers (not shown) residing on the Inside network 104 that require general access to resources residing in the immediate Outside network 106 or beyond it, but that do not provide any services that any node in the Outside network 106 require access to.
- An orchestration or session management device 118 that acts as an information relay function in between servers and hosts. This function requires a protocol that is outside the scope of this invention.

In accordance with embodiments of the invention, the NAT-device 102 may be equipped with a policy that dictates which Inside network 104 applications (identified by transport-layer ports or other means of more advanced identification, such as URL recognition), or endpoints (identified by IP-address), are to receive what particular NAT-translation behavior as sessions are established from the Inside to the Outside. Depending on which category a certain application or endpoint belongs to, the NAT-device 102 may dynamically instantiate a given type of translation entry as sessions are established from the Inside 104 to the Outside 106 and also remove related translation entries as sessions are terminated from either side.

In one embodiment, the NAT-device 102 is configured as a dynamic NAT device that is able to modify its translation behavior on a per session basis, as will now be explained for purposes of explanation, consider a scenario where the network 100 includes a set of endpoints and their respective applications or requirements as follows:

Inside Server1 (108), this server runs an application (App1) that outside entities must access but for security reasons network staff do not want to statically program a translation entry in the NAT-device but rather have Server1 establish initial connectivity from the inside Inside Host1 (112), this host requires access to servers and other resources located in the Outside network 106 and network staff do not want to provide beyond necessary exposure to this host for general network security reasons Outside Host2 (114), this host requires access to App1 on the Inside network 104 and resides in the Outside network 106

Outside Server2 (110), this server provides a generally accessible application (App2) and resides in the Outside network 106

Orchestrator-device 118 residing in the outside network 106. This device is known by Inside Server1 (108) and Outside Host2 (114) through means outside the scope of this invention Since App1 on Server1 (108) is designed for access from the Outside network 106, it may be configured to establish a session with the Orchestrator-device 118 soon after entering operational state locally on Server1 (108), in accordance with one embodiment. This leads to a translation entry being created on the NAT-device 102, where the locally configured policy dictates that sessions originating from a server on the Inside network 104 for App1 is to be managed using an Endpoint Independent NAT. Hence, an endpoint independent translation entry is created on the NAT-device 102, allowing any outside entity to establish a session with App1, as long as the destination IP-address is identical to the outside interface address of the NAT-device 102 and the destination port is identical to the one assigned by the NAT-device 102 as the outside port.

Outside Host2 (114) hosts a client of App1 that also tries to establish a session with any entity running App1 on the network. The location where App1 can be found is determined through a query of the Orchestrator-device 118. The Orchestrator-device 118 informs Host2 (114) that App1 can be found on Server1 (108) using the outside address of the NAT-device 102 and the outside port assigned by the NAT-device 102 when App1 first established the connection with the Orchestrator 100. Since the NAT-translation entry for App1 on Server1 (108) is created using Endpoint Independent logic, Host2 (114) can successfully establish a session with App1 on Server1 (108) through the NAT-device 102.

Concurrently with Host2 (114) connecting with App1. Host1 (112) needs to use the services of Server2 (110) and establishes a session through the NAT-device 102. The policy on the NAT-device 102 dictates that general sessions from Host2 (114) must instantiate translation entries built with a Symmetric logic, meaning that an Outside port is assigned to the session from Host1 (112) together with a filter that only allows return traffic from Server2 (110) and the specific application on Server2 (110) that Host1 (112) is accessing. With such a translation entry, no other entity can send traffic to Host1 (112) for the following reasons:

The outside entity is unlikely to know the randomly assigned port picked by the NAT-device 102 during session establishment Although the information can be spoofed, the outside entity needs to source its traffic from the source IP-address and application source Port used by Host1 (112) as a destination when first establishing the session with Server2 (110)

For the above scenario, the NAT-device 102 has, based on locally configured policy, established sessions for different endpoints on the inside in a dynamic fashion using different NAT-translation characteristics for those different endpoints. In the process, a minimal portion of the Inside network has been exposed to the Outside as opposed to a situation where every Inside endpoint is subject to the same treatment by the NAT.

In accordance with another embodiment of the invention, the control plane protocol gets more involved in order to better accommodate situations where it may be more difficult for the dynamic NAT device to foresee what the characteristics will be for incoming connections. For this embodiment consider the scenario where the network 100 includes the following devices and device characteristics:

Inside Server1 (108), this server runs an application (App1) that outside entities must access but for security reasons the network staff do not want to statically program a translation entry in the NAT-device but rather have Server1 (108) establish initial connectivity from the inside Outside Host3 (116), this host requires access to App1 on the Inside network 104 and resides in the Outside network 106. Host3 (116) resides on the Inside of a Symmetric NAT device 120 that does not have any of the facilities described in this text Orchestrator-device 118 residing in the outside network 106. This device is known by Inside Server1 (108) and Outside Host3 (116) through means outside the scope of this invention In accordance with the above scenario, the following events take place, in accordance one embodiment of the invention:

The control plane protocol establishes a session with the Orchestrator-device 118 soon after entering operational state locally on Server1 (108).

The same control plane protocol on Host3 (116) performs some additional actions. First it discovers the type of NAT device 120 it is sitting behind using means outside the scope of this invention. Secondly, It establishes a control plane session with the orchestrator device 118 and shares the discovered NAT-type with the orchestrator 118

The orchestrator 118, now having active control plane sessions with both Server1 (108) (116) and Host3, shares the Host3 (116) characteristics with Server1 (108).

Server1 (108) is either hosting the NAT-device (102) or has a control-plane connection with it, that allows for the dynamic creation of NAT-translation entries As soon as Host3 (116) has communicated its discovered NAT-attributes with the Orchestrator 118 and the Orchestrator 118 has communicated them onwards to Server1 (108), Server1 (108) instructs the NAT-device 102 to create a pending translation entry for Host3

Once Host3 (116) connects to Server1 (108), the NAT-device 102 completes the pending translation entry for Host3 (116) and, something that effectively blocks other incoming sessions from using it There are some differences in about scenario compared to the earlier scenario. For example, in the first scenario all activity was controlled by a configured policy on the NAT-device itself. In this last scenario, the NAT-device participates in the control plane operation and dynamically creates translation entries based on instructions received from Server1 on the inside.

In one embodiment, in order to prime the NAT device to create a useful pending translation entry it is desired that the remote entity (e.g. Host3), can be uniquely identified and not mistaken for some other entity sending spoofed packets or other illicit traffic. This can be achieved in a few different ways, depending on the required level of security:

- Host3 (116) will assign Discriminator value that it announces to the Orchestrator 118 along with its discovered NAT-type and the intent to initiate communication with Server1 (108). In one embodiment, the Discriminator may be a 64-bit value. A NAT prime-message used to complete the establishment of the pending translation entry then carries the Discriminator value while being sent towards the NAT from Host3 (116). The packet may be sent in clear text.
- The same NAT prime-message is sent, but is now encrypted using the Discriminator value as the encryption key. The receiving NAT device, knowing the source IP-address and port, will attempt to decrypt it using the Discriminator known from beforehand. If successful, the payload will reveal the Discriminator value as further confirmation that the packet was sent from the anticipated source. The encryption algorithm used could be any public or proprietary algorithm deemed appropriate for this purpose.

It would also be possible for the originator (Host3) to encrypt a BFD-packet (IETF RFC5880) inside an IPsec ESP payload (IETF RFC4303) and place the assigned discriminator value in the BFD-header field assigned for this purpose. Since BFD as currently specified only allows for a 32-bit discriminator, this would limit the Discriminator value for this application to 32-bits as well for this option. This approach requires that the encryption key has been shared through the orchestrator before attempting to establish communication, something that would be done using the same control plane as has been previously described.

The NAT-prime message can be carried in any session-oriented control channel that allows for the exchange of this type of messages. The NAT-prime message option could be composed as depicted below, in accordance with one embodiment of the invention:

| NAT Prime message format | | | | |
| --- | --- | --- | --- | --- |
| Bit offset | 0-7 | 8-15 | 16-23 | 24-31 |
| 0 | Length | | NAT-type | |
| 32 | Source | Prefix | IP | |
| 64 | Source-port | Start Range | End Range | Protocol |
| 96 | Session | Target | IP | |
| 128 | | Discriminator | | |
| 160 | | | | |

Once this message has been received by Server1 (108) from the Orchestrator 118, Server1 (108) will forward it to the NAT-device (102) that then instantiates the pending translation entry. Host3 (120) will then have to send a packet matching the communicated protocols fields along with the Discriminator value. The initial IP packet to match the pending NAT translation entry will be composed as follows (for IPv4, but this method is equally applicable to IPv6):

| Initial NAT prime IP packet | | | | |
| --- | --- | --- | --- | --- |
| Bit offset | 0-7 | 8-15 | 16-23 | 24-31 |
| 0 | Version IHL | TOS | Total | Length |
| 32 | Identification | | Flags Fragment | OffSet |
| 64 | | Source | IP | |
| 96 | | Destination | IP | |
| 128 | | Options | | |
| 160 | | Discriminator | | |
| 192 | | | | |

The NAT prime packet may be interleaved with the first session open packet sent from Host3 (116) until Server1 (108) responds to the session open and the session establishment process can continue between Host1 (112) and Server1 (108).

In accordance with some embodiments of the invention, the use of the Discriminator is optional and is not required for the described NAT-priming operation to succeed, but it does increase the level of security significantly and limits the number of attack vectors that could be used to try and exploit the pending NAT-translation entry for illicit access to the Inside network. In all the cases described above, the pending NAT-translation entry could have a finite lifetime that would either be determined at the time of implementation or explicitly configured to be adaptable to a specific network environment. This lifetime could range from tens of seconds to minutes.

Figure 3:
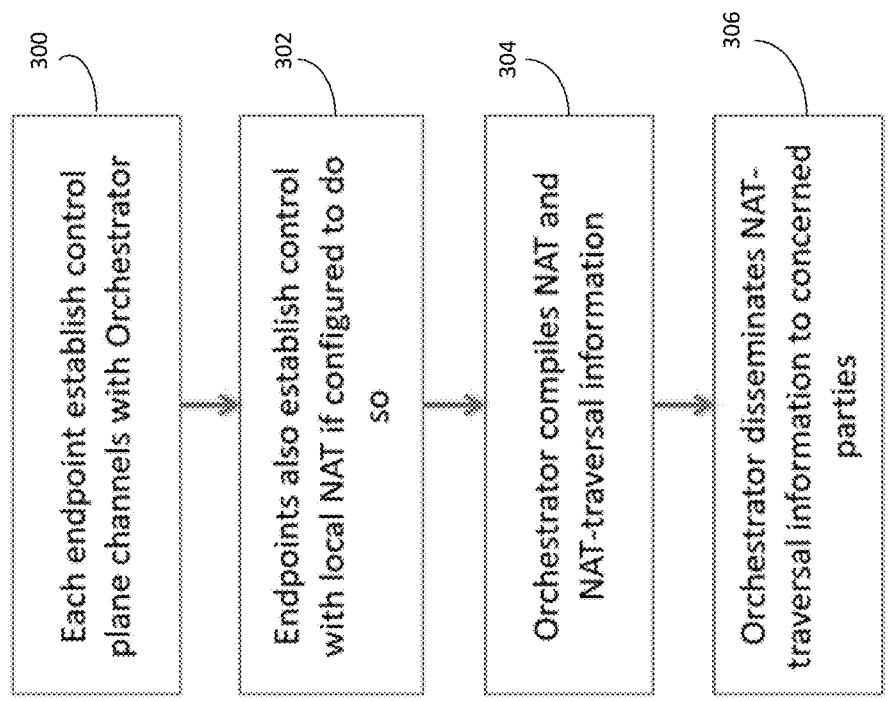
FIG. 3 shows a flowchart of operations for sharing NAT information within the network, in accordance with another embodiment of the invention.

Having explained the dynamic NAT behavior with reference to the above scenarios we now turn our attention to specific configuration and processing steps in order to realize the dynamic NAT behavior, in accordance with embodiments of the invention. Turning FIG. 3 of the drawings, there is shown a process for disseminating NAT information within a network. The process starts at block 300, where each endpoint establishes a control plane session/channel with the Orchestrator device 118. At block 302, the endpoints also establish control sessions with a local NAT device, if configured to do so. At block 304, the Orchestrator device 118 compiles NAT and NAT-traversal information. At block 306, the Orchestrator device 118 disseminates the NAT-traversal information to the various devices, as explained above. All competitions pursuant to the operations illustrated in FIG. 3 may be performed using the control plane.

Figure 4:
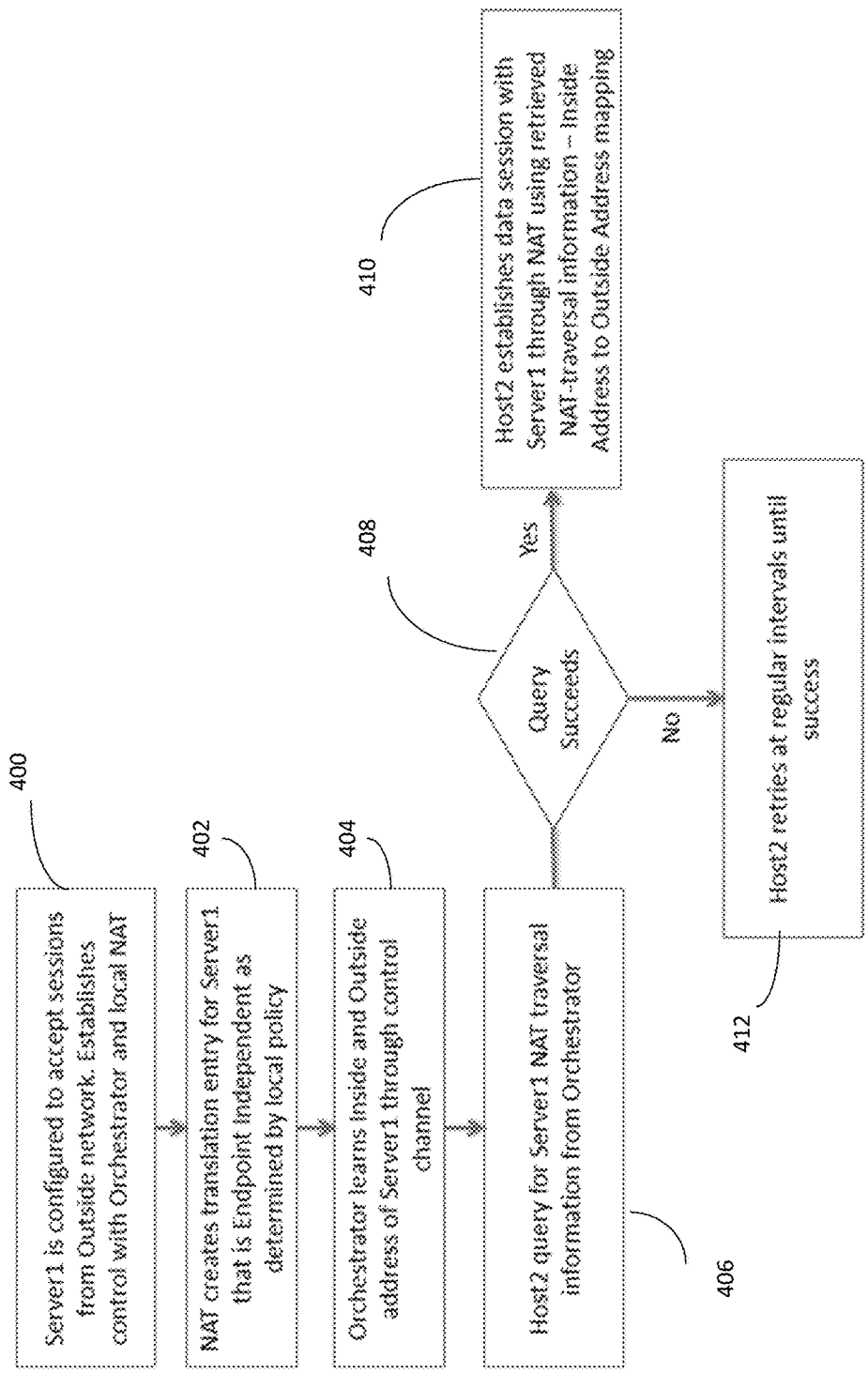
FIG. 4-6 show flowchart operations for achieving a dynamic NAT behavior, in accordance with different embodiments of the invention.

FIG. 4 shows the processing steps in order for the Host2 (114) to establish a forwarding plane session with the Server1 (108) via the NAT-device 102. Referring to FIG. 4, the block 400 indicates that the Server1 (108) is configured to accept sessions from the Outside network 106. The Server1 (108) is configured to establish control plane sessions with the Orchestrator 118 and the local NAT device 102. At block 402, the NAT device 102 creates a translation entry for the Server (108) that is Endpoint independent as determined by local policy. At block 404, the orchestrator 118 learns of the Inside and Outside address of the Server1 (108) the control channel. At block 406, the Host2 (114) initiates a query to the Orchestrator 118. The query is for the NAT traversal information associated with the Server1 (108). At block 408, if the query succeeds, then control process to block 410, otherwise the process to block 412. At block 410, the Host2 (114) establishes a data session with the Server1 (108) through the NAT device 102 using the retrieved NAT-traversal information that provides the Inside Address to Outside Address mapping. At block 410, the Host2 (114) retries at regular intervals to query the Orchestrator 118 for the NAT traversal information for the Server1 (108). As the reader will appreciate, the processing steps illustrated in FIG. 4 corresponded to the first a scenario described above.

Figure 5:
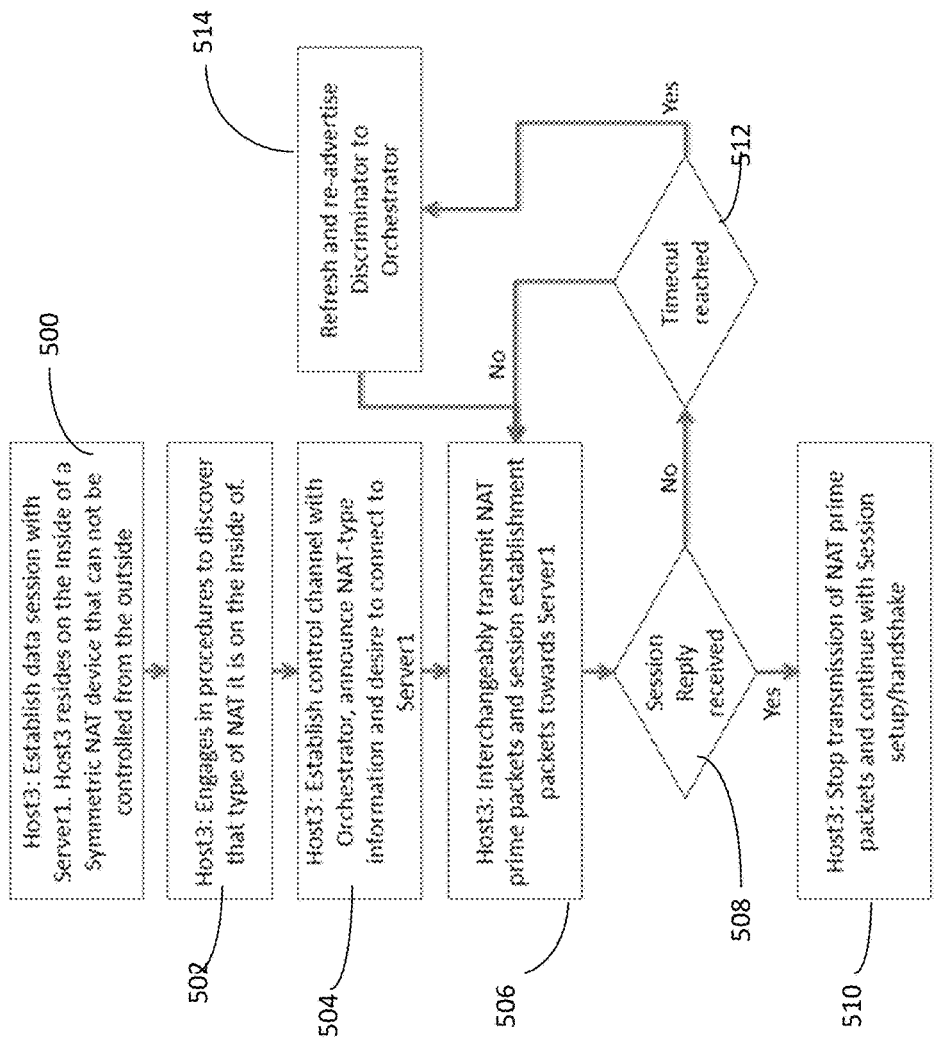

Turning now to FIG. 5 of the drawings, the processing steps corresponding to the second scenario described above are shown, in accordance with one embodiment of the invention. Referring to FIG. 5, the block 500 indicates that the Host3 (116) wishes to establish a data plane session with the Server1 (108). The Host3 (116) resides on the Inside of a Symmetric NAT device that cannot be controlled from the outside. At block 502, the Host3 (116) engages in procedures to discover the type of NAT device it is on the inside of. At block 504, the Host3 (116) establishes a control plane channel with the Orchestrator 118. The Host3 (116) uses this control plane channel with the Orchestrator 118 to announce NAT-type information and its desire to connect to the Server1 (108). At block 506, the Host3 (116) into tangibly transmits NAT prime packets and session establishment packets to us that Server1 (108), as described above. At block 508, the Host3 (116) determines if a session reply has been received from the Server1 (108). If a session reply has been received, then control process to block 510 where that Host3 (116) stops transmission of the NAT prime packets and continues with a Session set up forward/handshake procedure. If, a session reply has not been received, and a set lifetime timeout of the current discriminator has not been exceeded (block 512), then control is passed back to block 506. In case the current discriminator lifetime has been reached, a timeout event takes place at block 512 and control is passed to block 514. At block 514, the Host3 (116) performs a discriminator refresh and re-advertises either the same or a new Discriminator to the Orchestrator 118, at which point control passes back to the block 506.

Figure 6:
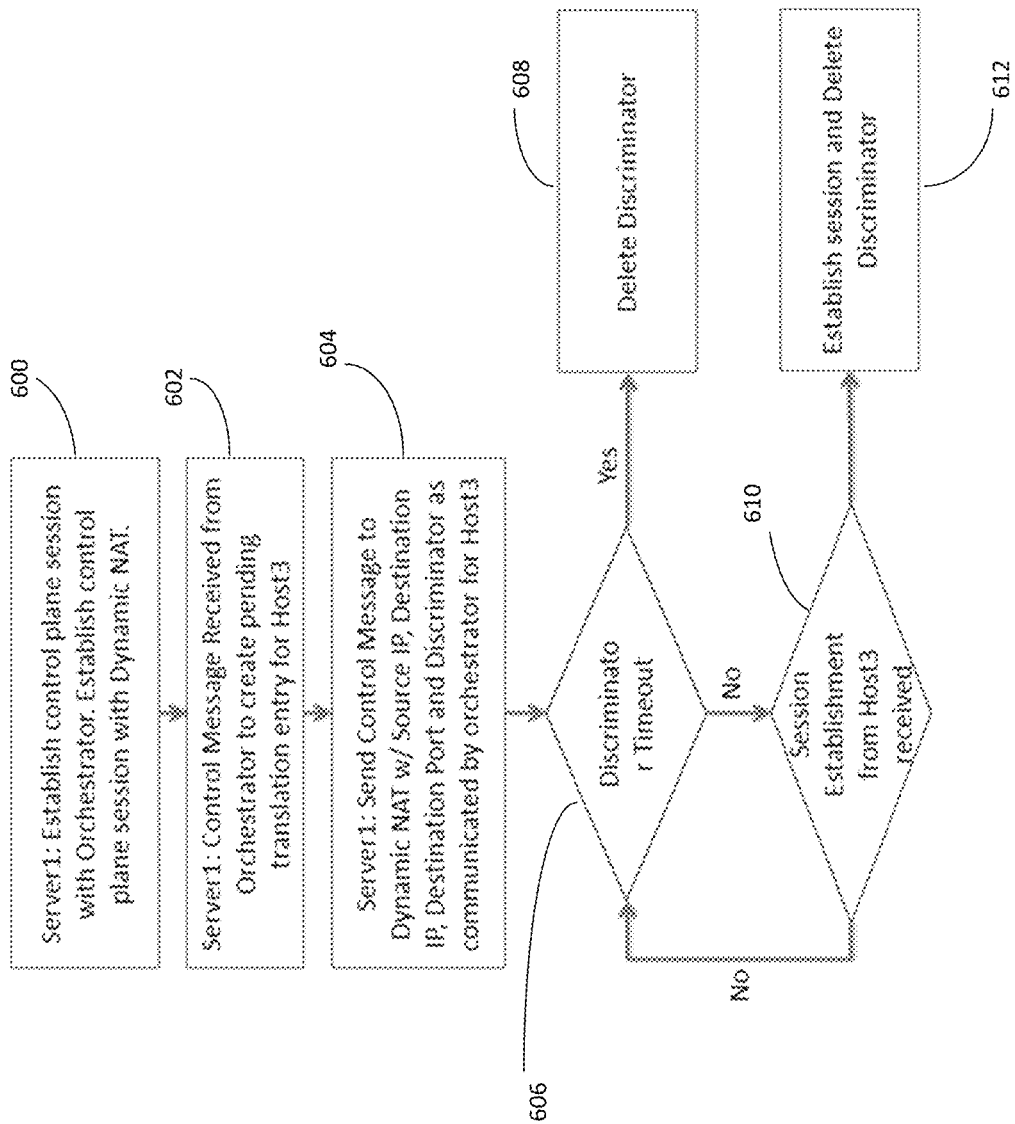

FIG. 6 indicates the processing by the Server 1 (108), in accordance with one embodiment of the invention, to establish a data plane session with the Host3 (116). The block 600, indicates that the Server1 (108) has already established a control plane session with the Orchestrator 118, and a control plane session with the dynamic NAT device 102. At block 602, the Server1 (108) receives a control plane message from the Orchestrator 118 which indicates to the Server1 (108) to create a pending translation entry for the Host3 (116). At block 604, the Server1 (108) sends a control message to the dynamic NAT device 102. This control message includes the Source IP, the Destination IP, the Destination Port, and the Discriminator as communicated by the Orchestrator 118, and which information corresponds the Host3 (116). At block 606, the Server1 (108) checks if a Discriminator timeout counter has been exceeded, in which case control process to block 608, where the Discriminator is deleted. If the Discriminator timeout counter has not been exceeded, then control passes to the block 610 where the session establishment request from the Host3 (116) is received. Controlled and passes to the block 612, where the data plane session with the Host3 (116) is established, and the Discriminator is deleted.

Figure 7:
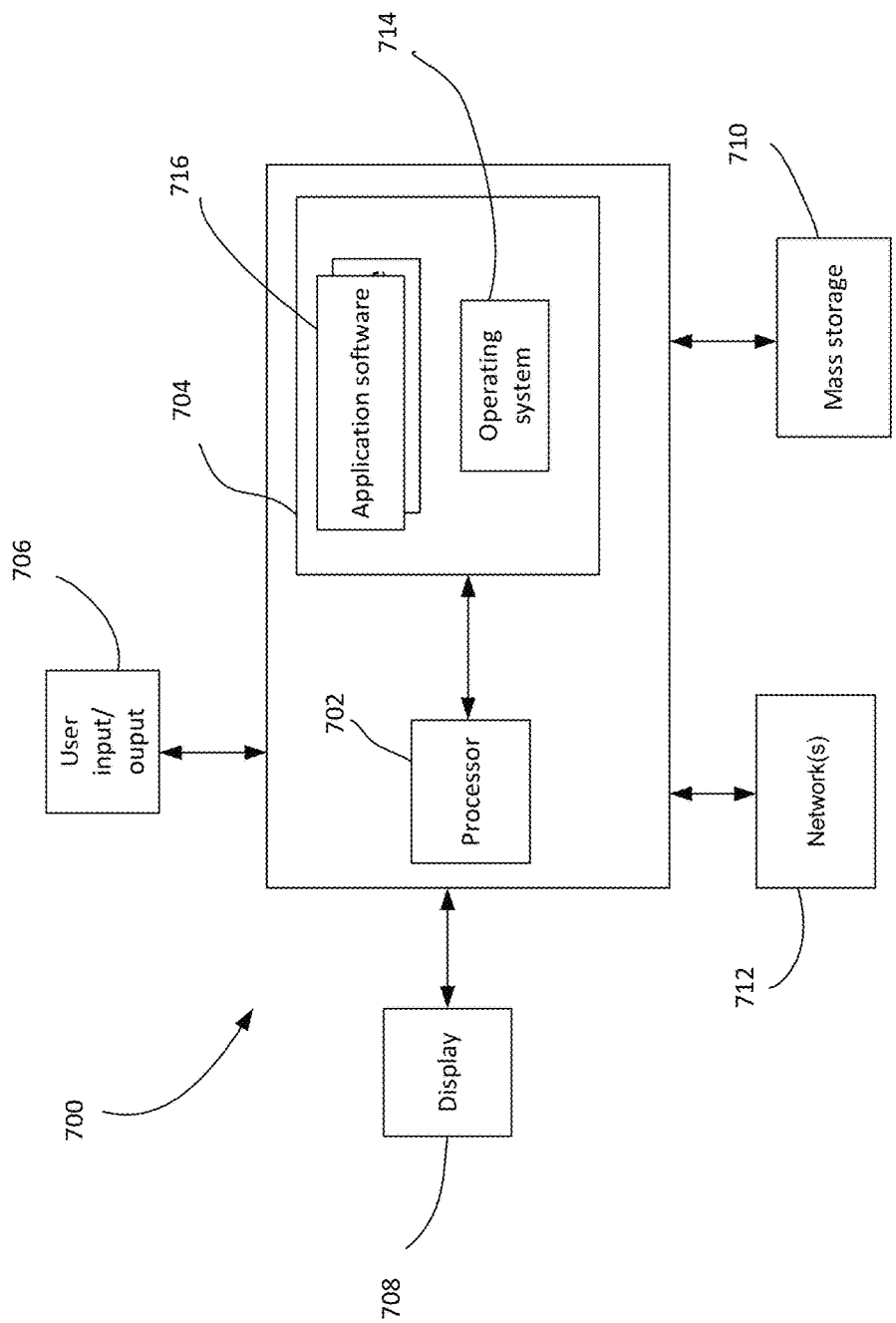
FIG. 7 shows an example of hardware that may be used to implement a Orchestrator, in accordance with one embodiment of the invention.

FIG. 7 shows an example of hardware 700 that may be used to implement the Orchestrator 118, in accordance with one embodiment. The hardware 700 may include at least one processor 702 coupled to a memory 704. The processor 702 may represent one or more processors (e.g., microprocessors), and the memory 704 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 704 may be considered to include memory storage physically located elsewhere in the hardware, e.g. any cache memory in the processor 702, as well as any storage capacity used as a virtual memory, e.g., as stored on a mass storage device.

The hardware also typically receives a number of inputs and outputs for communicating information externally. For interface with a user or operator, the hardware may include one or more user input devices 706 (e.g., a keyboard, mouse, etc.) and a display 708. For additional storage, the hardware 700 may also include one or more mass storage devices 710, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 712 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 712 and each of the components, as is well known in the art.

The hardware 700 operates under the control of an operating system 714, and executes application software 716 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 8:
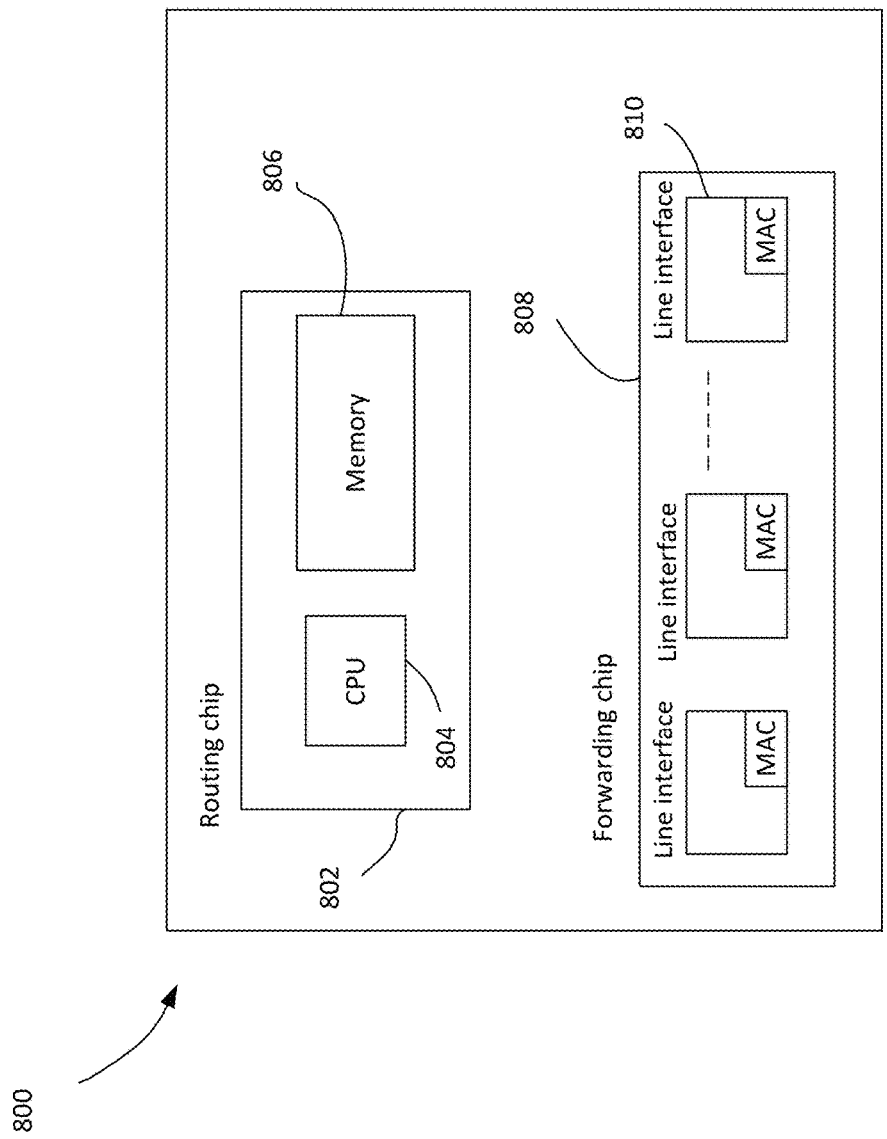
FIG. 8 shows a block diagram of hardware for a NAT-device, in accordance with one embodiment of the invention.

FIG. 8 shows a block diagram of hardware 800 for edge routers and hubs describe above, in accordance with one embodiment of the invention. Referring to FIG. 8, the hardware 800 includes a routing chip 802 coupled to a forwarding chip 808. The routing chip 802 performs functions such as path computations, routing table maintenance, and reachability propagation. Components of the routing chip include a CPU or processor 804, which is coupled to a memory 806. The memory stores instructions to perform the methods disclosed herein. The forwarding chip is responsible for packet forwarding along a plurality of line interfaces 810.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for establishing communication sessions based on a Network Address Translation (NAT) device, the method comprising: configuring the NAT device with a policy to control creation of NAT translation entries to support communications between devices residing behind the NAT device and devices residing outside the NAT device;
   concurrently establishing, in accordance with the policy:
   a first communication session with a first NAT traversal behavior selected from potential NAT traversal behaviors, the potential NAT traversal behaviors including variations in access to the devices behind the NAT device, and
   a second communication session with a second NAT traversal behavior selected from the potential NAT traversal behaviors, wherein the second NAT traversal behavior is different from the first NAT traversal behavior; and
   configuring the NAT device to maintain a control plane session with an orchestrator device, wherein the NAT device obtains parameters used to establish translation entries for the first communication session and the second communication session, the parameters related to the potential NAT traversal behaviors;
   wherein the orchestrator device is configured to use a control plane protocol to prime the NAT device with unique identifiers and unique attributes for specific incoming location sessions to facilitate NAT traversal.

2. The method of claim 1, further configuring the NAT device to perform additional operations comprising:
   receive NAT attributes for a second NAT device behind which a second device is located;
   create a pending translation entry for communication between a device residing behind the NAT device and the second device; and
   based on a connection being established between the device residing behind the NAT device and the second device, complete the pending translation entry.

3. The method of claim 2, wherein priming the NAT device includes configuring the NAT device to perform further operations comprising:
   receive a discriminator value from the orchestrator device, the discriminator value associated with the second device; and
   receive a message that includes the discriminator value from the second device;
   wherein completing the pending translation entry is further based on receiving the message.

4. The method of claim 3, wherein the message is encrypted using the discriminator value as an encryption key.

5. The method of claim 1, wherein the first NAT traversal behavior includes an Endpoint Independent traversal, and the second NAT traversal behavior includes a Symmetric traversal behavior.

6. The method of claim 1, further comprising changing the NAT traversal behavior associated with the first communication session from the first NAT traversal behavior to a third NAT traversal behavior, selected from the potential NAT traversal behaviors, is first communication session.

7. One or more non-transitory computer-readable media containing instructions that, when executed by one or more processors, are configured to cause a Network Address Translation (NAT) device to perform operations, the operations comprising:
   obtain a policy to control creation of NAT translation entries to support communications between devices residing behind the NAT device and devices residing outside the NAT device;
   concurrently establish, in accordance with the policy:
   a first communication session with a first NAT traversal behavior selected from potential NAT traversal behaviors, the potential NAT traversal behaviors include variations in access to the devices behind the NAT device, and
   a second communication session with a second NAT traversal behavior selected from the potential NAT traversal behaviors, wherein the second NAT traversal behavior is different from the first NAT traversal behavior; maintain a control plane session with an orchestrator device; and
   obtain, via the control plane session, parameters used to establish translation entries for the first communication session and the second communication session, the parameters related to the potential NAT traversal behaviors; and
   receive, from the orchestrator device via a control plane protocol, unique identifiers and unique attributes for specific incoming location sessions to prime the NAT device.

8. The computer-readable media of claim 7, the operations further comprising:
   receive NAT attributes for a second NAT device behind which a second device is located;
   create a pending translation entry for communication between a device residing behind the NAT device and the second device; and
   based on a connection being established between the device residing behind the NAT device and the second device, complete the pending translation entry.

9. The computer-readable media of claim 8, wherein priming the NAT device includes further operations comprising:
   receive a discriminator value from the orchestrator device, the discriminator value associated with the second device; and
   receive a message that includes the discriminator value from the second device;

wherein completing the pending translation entry is further based on receiving the message.

10. The computer-readable media of claim 9, wherein the message is encrypted using the discriminator value as an encryption key.

11. The computer-readable media of claim 7, wherein the first NAT traversal behavior includes an Endpoint Independent traversal, and the second NAT traversal behavior includes a Symmetric traversal behavior.

12. The computer-readable media of claim 7, the operations further comprising change the NAT traversal behavior associated with the first communication session from the first NAT traversal behavior to a third NAT traversal behavior, selected from the potential NAT traversal behaviors, during the first communication session.

13. A system comprising:
an orchestrator device; and
a Network Address Translation (NAT) device in communication with the orchestrator device and comprising:
   one or more processors; and
   one or more non-transitory computer-readable media containing instructions that, when executed by the one or more processors, are configured to cause the NAT device to perform operations, the operations comprising:
      obtain a policy to control creation of NAT translation entries to support communications between devices residing behind the NAT device and devices residing outside the NAT device;
      concurrently establish, in accordance with the policy:
         a first communication session with a first NAT traversal behavior selected from potential NAT traversal behaviors, the potential NAT traversal behaviors include variations in access to the devices behind the NAT device, and
         a second communication session with a second NAT traversal behavior selected from the potential NAT traversal behaviors, wherein the second NAT traversal behavior is different from the first NAT traversal behavior;
      maintain a control plane session with the orchestrator device;
      obtain, via the control plane session, parameters used to establish translation entries for the first communication session and the second communication session, the parameters related to the potential NAT traversal behaviors; and
      receive, from the orchestrator device via a control plane protocol, unique identifiers and unique attributes for specific incoming location sessions to prime the NAT device.

14. The system of claim 13, wherein the operations further comprise changing the NAT traversal behavior associated with the first communication session from the first NAT traversal behavior to a third NAT traversal behavior, selected from the potential NAT traversal behaviors, first communication session.

* * * * *